US008385879B2

(12) United States Patent
Thomas

(10) Patent No.: US 8,385,879 B2
(45) Date of Patent: Feb. 26, 2013

(54) SYSTEMS AND METHODS FOR PROVIDING CONTACTS IN EMERGENCY SITUATION

(75) Inventor: Christopher Harvey Thomas, Richmond, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 12/534,797

(22) Filed: Aug. 3, 2009

(65) Prior Publication Data

US 2011/0028118 A1   Feb. 3, 2011

(51) Int. Cl.
    *H04W 4/22*   (2009.01)
(52) U.S. Cl. ............. 455/404.1; 455/414.1; 379/45
(58) Field of Classification Search ........... 455/404.1, 455/414.1, 418, 425, 401; 379/37, 45
See application file for complete search history.

(56) References Cited

U.S. PATENT DOCUMENTS

| | | | |
|---|---|---|---|
| 6,678,358 B2 | 1/2004 | Langsenkamp et al. | |
| 7,349,530 B2 * | 3/2008 | Griffiths | 379/121.04 |
| 7,962,119 B2 * | 6/2011 | Kuz et al. | 455/404.1 |
| 2004/0203622 A1 | 10/2004 | Esque et al. | |
| 2007/0189246 A1 * | 8/2007 | Molnar | 370/338 |
| 2008/0132199 A1 * | 6/2008 | Hirata | 455/404.2 |
| 2008/0208605 A1 * | 8/2008 | Sinha et al. | 705/1 |
| 2008/0226039 A1 | 9/2008 | Goldman et al. | |
| 2009/0005068 A1 * | 1/2009 | Forstall et al. | 455/456.1 |
| 2009/0170568 A1 * | 7/2009 | Karino | 455/569.2 |
| 2009/0203350 A1 * | 8/2009 | Gottlieb | 455/404.1 |
| 2010/0190479 A1 * | 7/2010 | Scott et al. | 455/414.1 |
| 2010/0240337 A1 * | 9/2010 | DiMeo et al. | 455/404.1 |
| 2011/0021173 A1 * | 1/2011 | Randhawa et al. | 455/404.1 |
| 2011/0088003 A1 * | 4/2011 | Swink et al. | 715/863 |
| 2012/0015622 A1 * | 1/2012 | Kuz et al. | 455/404.2 |

FOREIGN PATENT DOCUMENTS

| | | |
|---|---|---|
| JP | 2008-244732 A | 10/2008 |
| KR | 10-2007-0082661 A | 8/2007 |
| WO | WO-2007-070749 A2 | 6/2007 |

OTHER PUBLICATIONS

International Search Report mailed Apr. 22, 2011, in international application No. PCT/US2010/043800.
International Preliminary Report on Patentability issued Feb. 7, 2012, in international application No. PCT/US2010/043800.

* cited by examiner

*Primary Examiner* — Kamran Afshar
*Assistant Examiner* — Khawar Iqbal

(57) ABSTRACT

A system, a method, and a computer readable storage medium are disclosed for providing emergent contacts by a mobile computing device to a user when such contacts are likely to be desirable by the user. The emergent contacts are selected by the user and can be optionally assigned quick keys on a key pad of the mobile computing device. After an emergent phone call was made using the mobile computing device, the emergent contacts are retrieved and displayed for user selection. When an emergent contact is selected, a phone call to the selected contact is initiated by the mobile computing device.

16 Claims, 7 Drawing Sheets ized as viable alternatives that may be employed without departing from the principles of what is claimed.

SYSTEMS AND METHODS FOR PROVIDING CONTACTS IN EMERGENCY SITUATION

BACKGROUND

1. Field of Art

The disclosure generally relates to the field of contact management in wireless communication devices.

2. Description of Art

As mobile phones become more powerful and reliable, people carry their mobile phones with them and depend on their mobile phones for daily communications (e.g., phone call, text message, email). Mobile phones are also convenient to use in case of emergency. Mobile phone users often use their mobile phones to request emergency assistance through an emergency phone call (e.g., a 9-1-1 call).

In case of emergency, it is often desirable to contact a few important people (e.g., family members, close friends) either to ask for help or to notify them of important information, particularly after placing an emergency assistance request call. However, in such situation people often are unable to remember to make such contact, who to contact, or how to make contact. In addition, a mobile phone user may be incapacitated in an emergency situation. Often, emergency response personnel are available to help with follow up, but do not know who to follow up with as a contact for the incapacitated user.

Thus, the art lacks, inter alia, a system and method for a mobile phone to provide specific follow up contacts in emergency situations.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1a illustrates one embodiment of a mobile computing device in a first positional state.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

One embodiment of a disclosed system, method and computer readable storage medium provides a configuration to identify and initiate contact with entities in a contact database to access in follow up type situations such as an emergency, call for help, accident, or the like ("emergent contacts"). For ease of discussion herein, reference to emergency includes not only emergencies but also accidents, call for help, and the like. A user can establish emergent contacts in a mobile computing device in advance. When the mobile computing device detects an emergency situation has occurred, it displays the emergent contacts to facilitate convenient communication with the emergent contacts.

Example Mobile Computing Device

Figure 1:
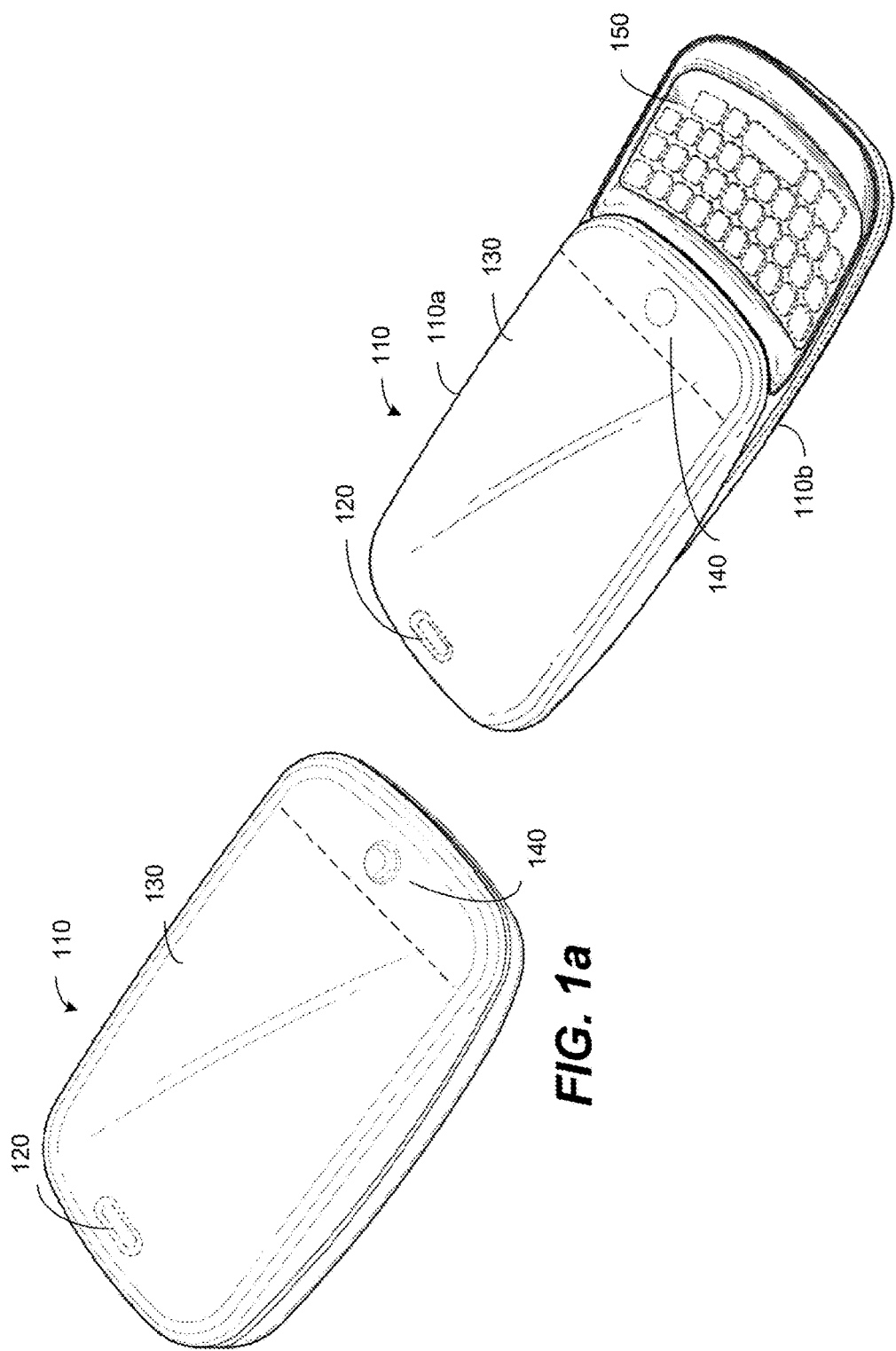
FIG. 1b illustrates one embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. Figure (FIG.) 1a illustrates one embodiment of a first positional state of the mobile computing device 110 having telephonic functionality, e.g. a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
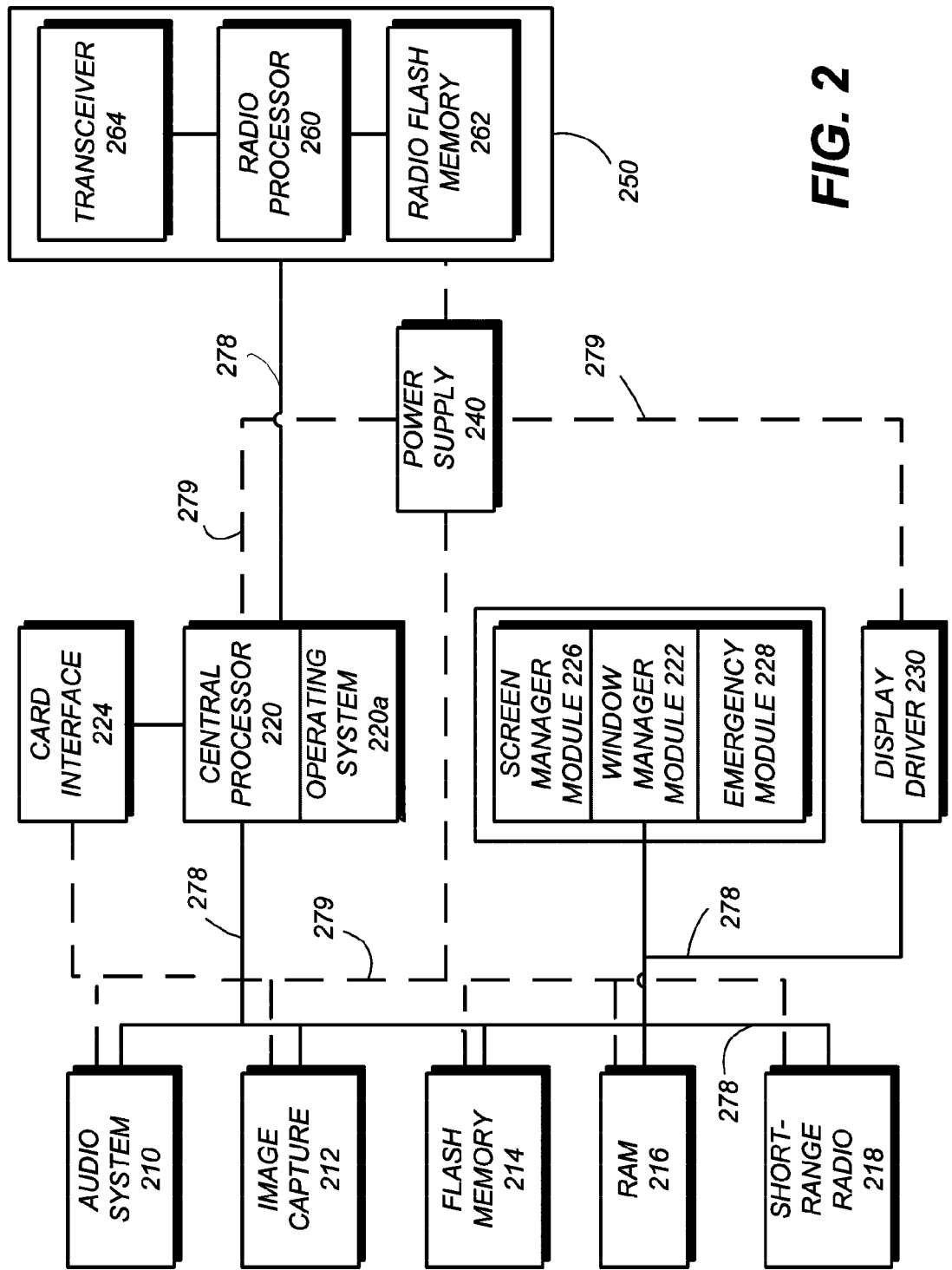
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250.

Examples of a central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like.

The central processor 220 is configured for operation with a computer operating system 220a. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system ("OS") include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE OS (CHROME or ANDROID), and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An emergency module 228 comprises software that is, for example, integrated with the operating system or configured to be an application operational with the operating system. In some embodiments module 228 may comprise firmware, for example, stored in the flash memory 214. The emergency module 228 is configured to provide access to and information about emergent contacts. Emergent contacts (also known as primary contacts, designated contacts) are persons (or entities) that are likely to be desirable by a user in case of emergency. The emergent contacts are pre-identified (e.g., by the user) within the system (e.g., within a contact database). An emergent contact includes information such as identity of the person (e.g., name) and the person's contact information (e.g., phone numbers, addresses, email addresses, etc.). Examples emergent contacts of a user include the user's family members, close friends, and coworkers. The emergency module 228 enables the user to set the emergent contacts and optionally to assign quick keys to the emergent contacts. In addition, the emergency module 228 determines whether an emergency situation has occurred and if so displays the emergent contacts to facilitate convenient communication with the emergent contacts.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Example Architectural Overview of the Emergency Module

Figure 3:
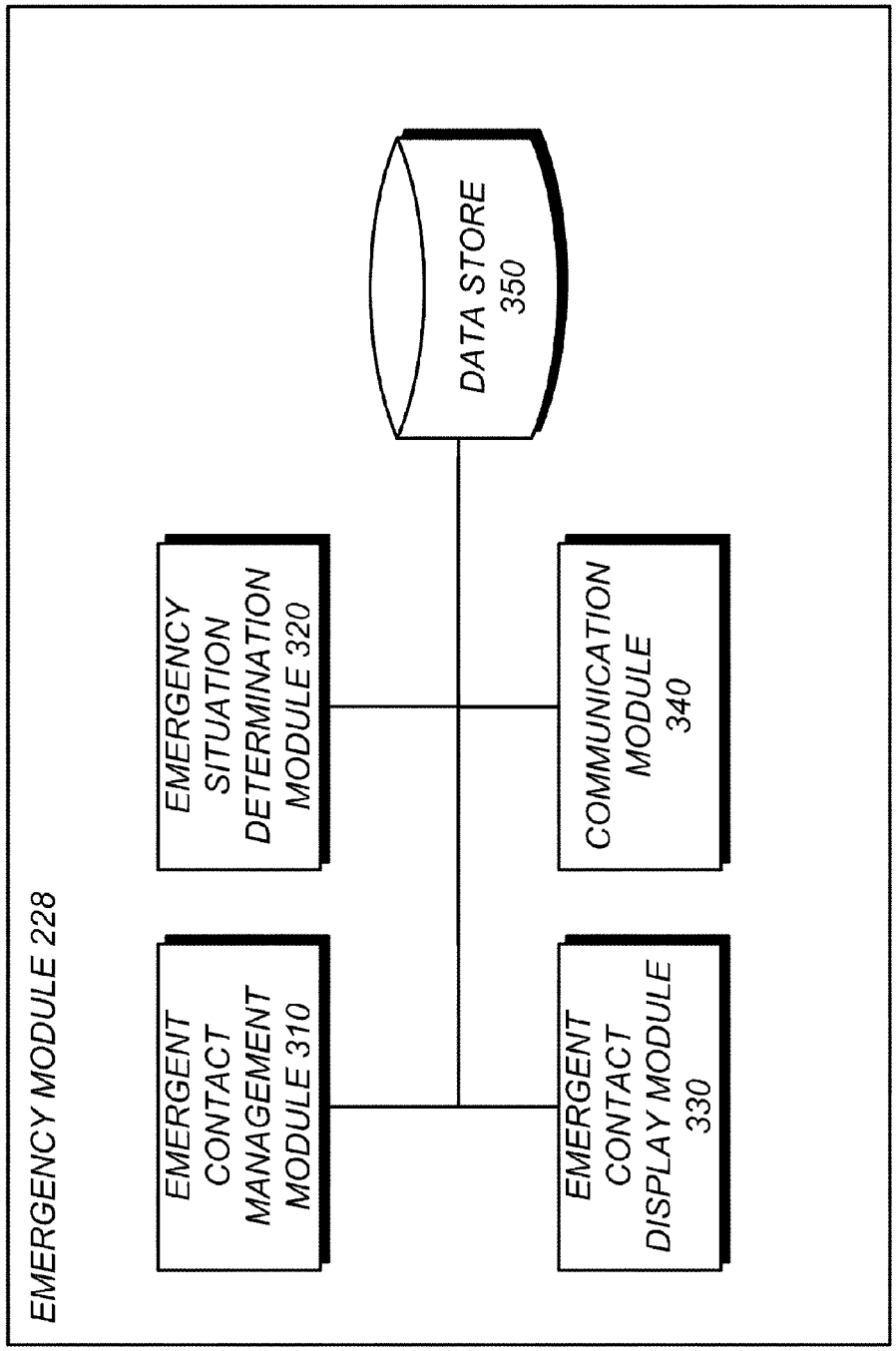
FIG. 3 illustrates one embodiment of an architecture of an emergency module of the mobile computing device.

Referring now to FIG. 3, a high-level block diagram illustrating a detailed view of modules within the emergency module 228 according to one embodiment. Some embodiments of module 228 have different and/or other modules than the ones described herein. Similarly, the functions can be distributed among the modules in accordance with other embodiments in a different manner than is described here. As illustrated, the emergency module 228 includes an emergent contact management module 310, an emergency situation determination module 320, an emergent contact display module 330, a communication module 340, and a data store 350.

The emergent contact management module 310 manages emergent contacts (also referred to as primary contacts, designated contacts). As described above, emergent contacts are contact information of the persons or entities to be contacted in case of emergency, accident, or the like. The user can interact with the module 310 to establish or modify the emergent contacts (e.g., through a graphical user interface displayed on the screen 130 and the keypad 150). For example, the module 310 may retrieve preexisting contacts (either stored locally or remotely) and display them for user selection. Alternatively or additionally, the user may input new contact and/or contacting information (e.g., phone number, address, email address). The user may also assign quick keys to the emergent contacts. A quick key is a keyboard shortcut to initiate a communication (e.g., a phone call) with a contact. The quick key can be a physical key on the keypad 150 or a soft key displayed on the screen 130. Once assigned, the user can trigger the quick key to initiates a phone call with the emergent contact associated with the quick key (e.g., when the emergent contacts are displayed on the screen 130).

According to one embodiment, the emergent contact management module 310 maintains a set of three special contacts, each with a phone number. The three contacts are assigned to quick keys 'I', 'C', and 'E', accordingly, which collectively stand for In Case of Emergency. Alternatively or in addition, each of the contacts may also be assigned a numeric key (e.g., '4', '2', and '3', accordingly). The set of special contacts are one example of emergent contacts and other configurations may be possible, for example, keys corresponding to '1', '2', '3', or 'Q', 'W', 'E', 'R', 'T', 'Y' (e.g., on a QWERTY keyboard). However, it is noted that, for ease of discussion of the principles herein, reference will be made to the above example set of special contacts as the I-C-E contacts in the following description.

The emergency situation determination module 320 determines whether an emergency situation has occurred for the user of the mobile computing device 110. According to one embodiment, the module 320 makes the determination based on whether an emergency phone number has been dialed. Examples of emergency phone numbers include 9-1-1, 1-1-2, 9-9-9, 0-0-0, 1-1-0, 1-1-8, 1-1-9. Base mobile computing device 110, there maybe one or more emergency phone numbers available. Appendix A contains a list of commonly used emergency phone numbers and associated countries/regions. The user can customize the emergency phone numbers by adding emergency phone numbers (e.g., phone numbers of entities such as the local police station, the local/national domestic violence hotline, etc.). For ease of description, 9-1-1 will be used as an example of the emergency phone number, although based on a geographic location of the mobile computing device 110, other numbers listed in the appendix A may be used in stead (or in addition).

The emergent contact display module 330 retrieves and displays emergent contacts (e.g., the I-C-E contacts) to facilitate convenient communication with the emergent contacts. For example, when the emergency situation determination module 320 determines an emergency situation just occurred, the module 320 may invoke the emergent contact display module 330 to prominently display the emergent contacts (e.g., on the screen 130) such that the user or an emergency response personal may conveniently initiate communications (e.g., a phone call) with the emergent contacts.

The communication module 340 initiates a communication (e.g., a phone call) with an emergent contact when such a communication is desirable. The communication can be initiated in response to a user input (e.g., a selection of the displayed emergent contacts or an activation of an associated quick key). Alternatively, the communication can be initiated automatically in response to an emergency situation determination. For example, when the emergency situation determination module 320 determines an emergency situation just occurred, the module 320 may invoke the communication module 340 to automatically transmit messages (e.g., text messages, pre-recorded voice messages) to one or more of the emergent contacts. The message may contain information such as those the module 320 utilizes to determine the emergency situation. For example, the message may contain the emergency number dialed, and geographic location information of the mobile computing device 110, such as the GPS coordinates and cell tower-based location tracking information.

In one embodiment, the emergency situation determination module 320 applies program logic rules (called emergency plus rules) to determine the operations to be performed in response to a determination that an emergency situation has just occurred. Several example emergency plus rules are listed below:

If a 9-1-1 call was made and terminated, then display the I-C-E contacts.

If a 9-1-1 call was made and terminated, then transmit a text message to the I-C-E contacts, the text message including the timing of the 9-1-1 call and the latest GPS coordinates of the mobile computing device 110.

If an acceleration exceeding a predetermined threshold value (e.g., ±10 miles per second) was detected, then send a text message to a roadside assistance service including the latest GPS coordinates of the mobile computing device 110, and display the I-C-E contacts.

The data store 380 stores data used and/or generated by the emergency module 228. Examples of such data include the emergent contacts (e.g., the I-C-E contacts), the emergency plus rules, and pre-populated messages to be sent out in case of emergency. The data store 380 may be a relational database or any other type of database.

Example Emergency Module Operation Overview

Figure 4:
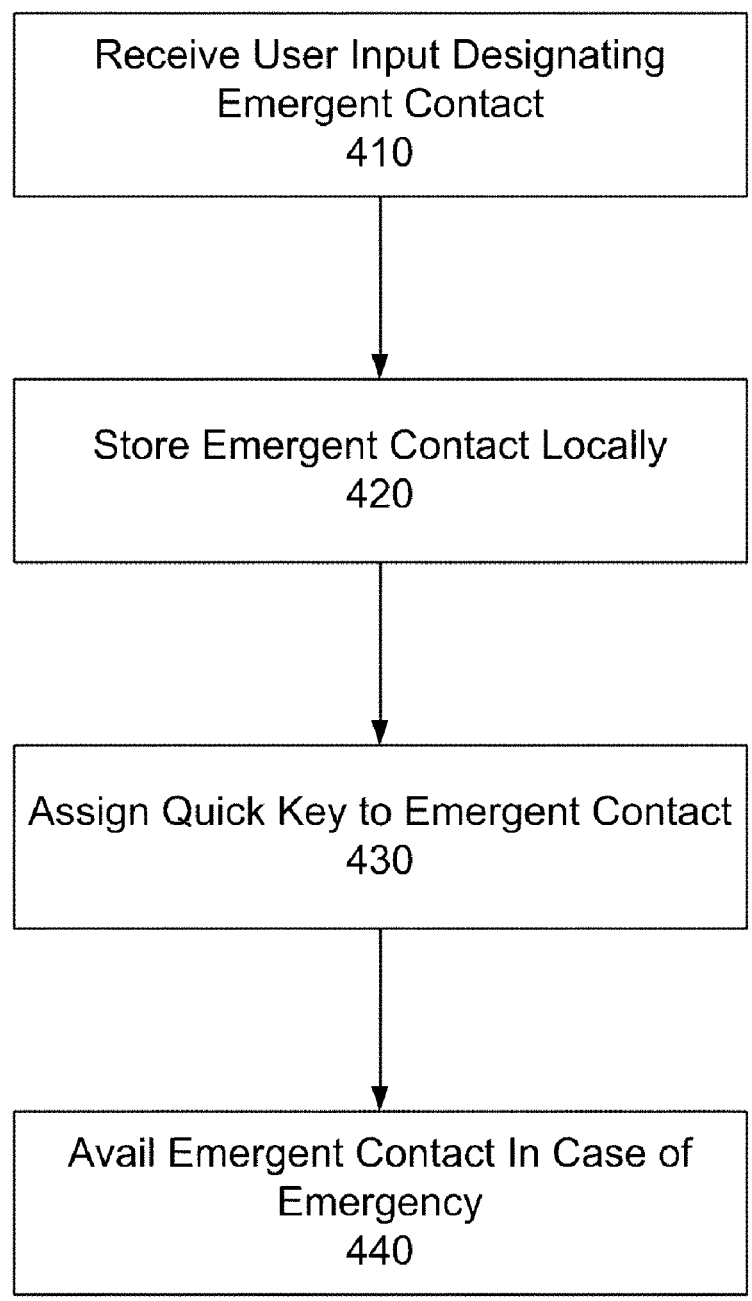
FIGS. 4 and 5 illustrate one embodiment of an operation of the emergency module.

Referring now to FIG. 4, a flow diagram illustrating one embodiment of an operation of the emergency module 228. By way of example, the operation illustrated in FIG. 4 will be described with respect to the architectures of FIGS. 2 and 3 and the mobile computing device of FIGS. 1a and 1b.

The emergency module 228 receives 410 a user input designating a contact as an emergent contact (or primary contact, pre-designated contact). In one embodiment, the emergency module 228 retrieves preexisting contacts from a local storage (e.g., the flash memory 214, the RAM memory 216) or from an external server (e.g., from a Microsoft Outlook Server) and displays the contacts on the screen 130 for user selection. The user may select one or more of the displayed contact as emergent contacts through the touch-sensitive display, the navigation ring 140, or other input device of the mobile computing device 110. In response to receiving 410 the user selection, the emergency module 228 stores 420 the designated contact as an emergent contact locally (e.g., in the flash memory 214, the RAM memory 216). The emergency module 228 optionally assigns 430 a quick key to the designated emergent contact.

Figure 6A:
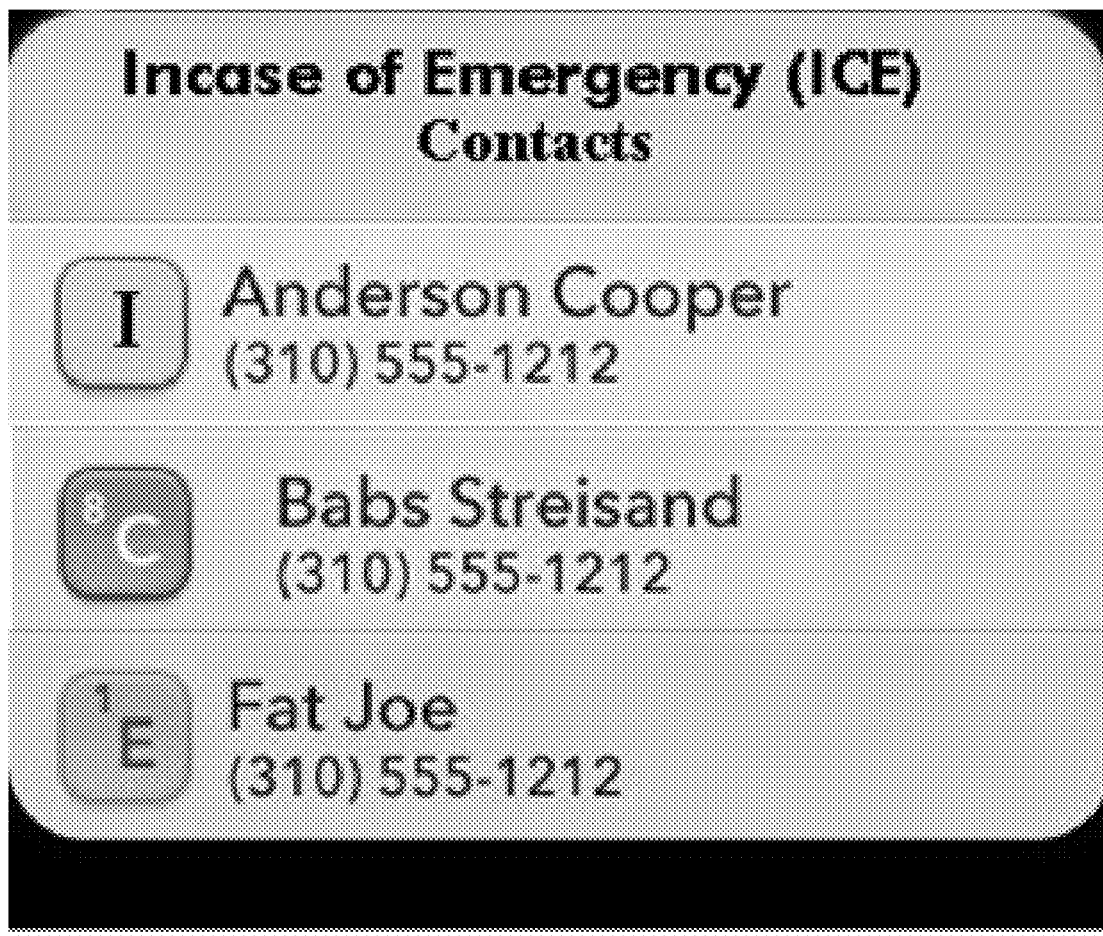
FIGS. 6a and 6b are screenshots of a mobile computing device according to one embodiment.

FIG. 6A is a screenshot of the mobile computing device 110 displaying I-C-E contacts. As shown, Anderson Cooper is designated as a first I-C-E contact and associates with a quick key 'I'. Babs Streisand is designated as a second I-C-E contact and associates with a quick character key 'C' and a quick numeric key '8'. Fat Joe is designated as a third I-C-E contact and associates with a quick character key 'E' and a numeric key '1'.

The emergency module 228 avails 440 the emergent contacts in case of emergency to facilitate convenient communication with the emergent contacts. An example process of availing 440 the emergent contacts is described in detail below with relate to FIG. 5.

Figure 5:
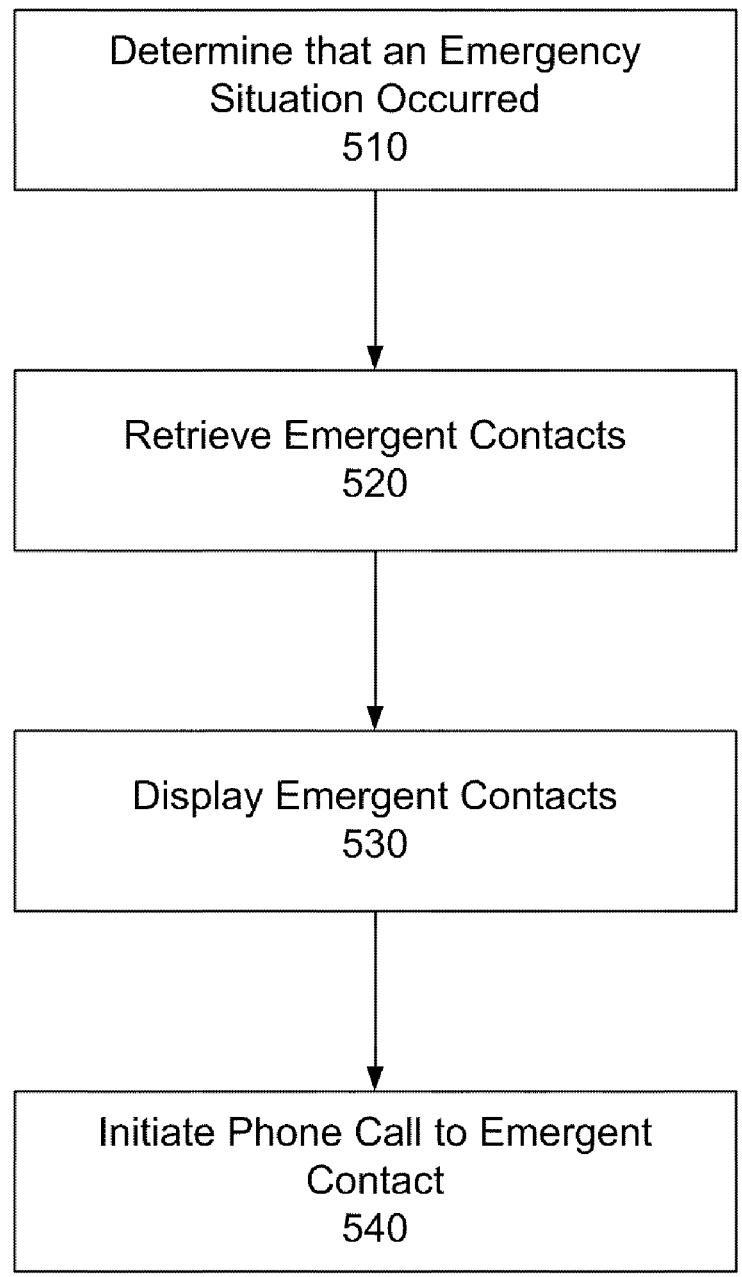

Referring now to FIG. 5, a flow diagram illustrating one embodiment of a process for the emergency module 228 to avail emergent contacts in case of emergency. The emergency module 228 determines 510 that an emergency situation occurred. The emergency module 228 makes the determination 510 utilizing available information according to logical rules (i.e., emergency plus rules). For example, if an emergency phone call was made (i.e., a phone call to/from an emergency phone number such as 9-1-1), the emergency module 228 determines 510 that an emergency situation occurred.

Figure 6B:
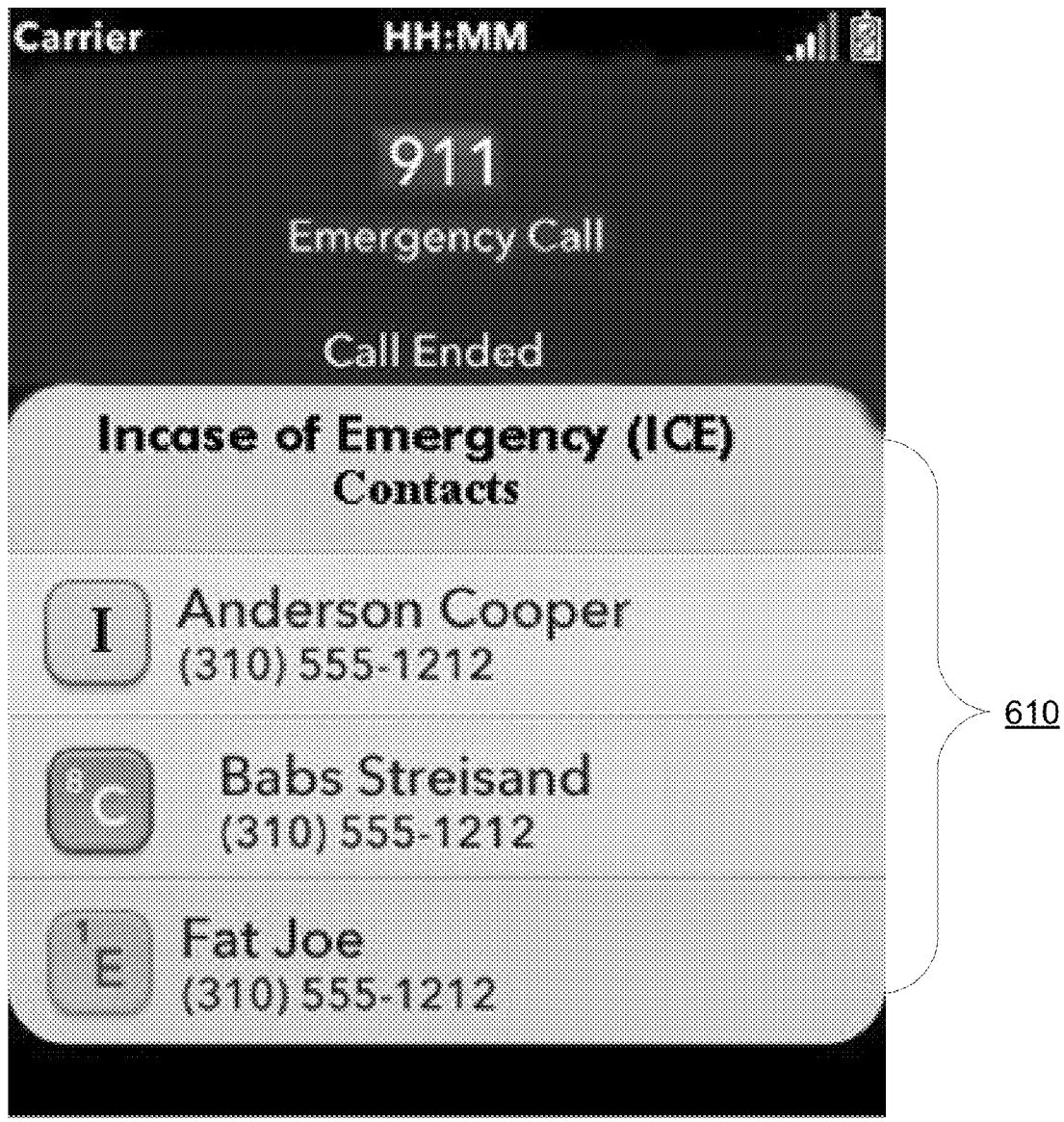

The emergency module 228 retrieves 520 emergent contacts and displays 530 the emergent contacts (e.g., after the emergency phone call terminates). FIG. 6B is a screenshot of the mobile computing device 110 displaying 530 the I-C-E contacts after an 9-1-1 emergency phone call. As shown, a dialog box 610 containing the I-C-E contacts is displayed prominently to facilitate convenient access. The display can also help emergency response personal in case the owner of the mobile computing device 110 has been incapacitated or otherwise unable to coherently communicate. In one embodiment, the dialog box 610 is displayed until affirmatively dismissed or a phone call to one of the displayed emergent contacts has been initiated.

The user can select a displayed emergent contact to initiate a communication. In response to a user selection, the emergency module 228 initiates 540 a phone call to the selected emergent contact.

In addition to, or instead of, displaying 530 the emergent contacts and initiating 540 a phone call responsive to a user selection, the emergency module 228 may perform other operations such as automatically transmitting messages to the emergent contacts by applying applicable emergency plus rules. In one embodiment, the messages include geographic location information of the mobile computing device 110, such as the GPS coordinates and cell tower-based location tracking information.

Additional Embodiments

In one embodiment, the emergency module 228 is a part of the Enhanced 9-1-1 system (or E9-1-1) of the mobile computing device 110, and has access to geographic location information of the device 110 (e.g., GPS coordinates, cell tower-based location tracking information) and other information that maybe otherwise subject to access restriction. The emergency module 228 can include such information in the automatic messages to be transmitted to the emergent contacts in case of emergency.

In one embodiment, in addition to or instead of availing emergent contacts in emergency situations, the mobile computing device 110 can be configured to detect events (either emergency event or not) configured to trigger retrieval and display of a collection of pre-designated contacts, and retrieve and display the pre-designated contacts in response to the event detection.

In one embodiment, in addition to or instead of phone calls made to and/or from an emergency phone number, the mobile computing device 110 utilizes other information to determine whether an emergency situation has occurred. Such information includes geographic location information (e.g., from a GPS unit on the mobile computing device 110), acceleration information (e.g., from an on-board accelerometer unit), temperature information (e.g., from an on-board thermometer unit), a quality of available wireless signals (e.g., from the transceiver 264), number of missed phone calls and/or uncheck messages, to name a few. For example, if an accelerometer unit on the mobile computing device 110 indicated that the mobile computing device 110 just experienced a drastic acceleration change (e.g., caused by an automobile accident), the mobile computing device 110 can determine that an emergency situation has just occurred. In response of the detected acceleration change exceeding a predetermined threshold value, the device 110 can be configured to call the emergency phone number for the area, play a pre-recorded emergency message, and provide location information (e.g., coordinates determined by the GPS unit as described above). After terminating the emergency phone call, the device 110 can be configured to call others (e.g., the emergent contacts) with another pre-recorded message.

The disclosed embodiments beneficially allow for convenient access to emergent contacts in emergency situations, and thus facilitate important communications when such communications are highly desirable. In addition, the disclosed embodiments provide a customizable mechanism to automatically transmit messages to a pre-determined set of contacts in emergency situations. The messages can be configured to include important information (e.g., information about the emergency situation triggering the message transmission).

Some portions of above description describe the embodiments in terms of algorithms and symbolic representations of operations on information, for example, as illustrated and described with respect to FIGS. 2, 3, 4, and 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing emergent contacts in case of emergency through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

APPENDIX A

International Emergency Numbers

| Country | Police | Medical | Fire |
|---|---|---|---|
| Chad | 17 | | 18 |
| Djibouti | 17 | | 18 |
| Egypt | 122 | 123 | 180 |
| Ghana | 191 | 193 | 192 |
| Mali | 17 | 15 | 18 |
| Morocco | City 19 Country 177 | 15 | 15 |
| Nigeria | 199 | 199 | 199 |
| South Africa | 10111 | 10177 | 10111 |
| Tunisia | 197 | 190 | 198 |
| Rwanda | 112 | | |
| Uganda | 999 | | |
| Sudan | 999 | 999 | 999 |
| Sierra Leone | 19 | 999 | |
| Zambia | 999 | 991 | 993 |
| Zimbabwe | 995 | 994 | 993 |
| People's Republic of China | Patrol: 110 Traffic: 122 | 120 | 119 |
| Myanmar | | 199 | |
| Hong Kong | | 999 | |
| Republic of China (Taiwan) | 110 | | 119 |
| India | 100 | 102 | 101 |
| Indonesia | 110 | 118/119 | 113 |
| Iran | 110 | 115 | 125 |
| Israel | 100 | 101 | 102 |
| Japan | 110 | | 119 |
| Republic of Korea | 112 | | 119 |
| Kuwait | | 777 | |
| Lebanon | 112 | 140 | 175 |
| Macau | | 999 318 | |
| Malaysia | | 999 | |
| Mongolia | 102 | 103 | 101 |
| Nepal | 100/103 | | 101 |
| Oman | | 9999 | |
| Pakistan | 15/1122 | 115 | 16 |
| Philippines | | 117 | |
| Qatar | | 999 | |
| Saudi Arabia | 999 | 997 | 998 |
| Singapore | 999 | | 995 |
| Sri Lanka | 119 or 118 | 110 | 111 |
| Thailand | 191 | 1669 | 199 |
| United Arab Emirates | 999 or 112 | 998 or 999 | 997 |
| Vietnam | 113 | 115 | 114 |
| Albania | 19 | 17 | 18 |
| Austria | | 112 | |
| Belarus | 102 | 103 | 101 |
| Belgium | 101 | 100 | |
| Bosnia and Herzegovina | 122 | 124 | 123 |
| Bulgaria | 166 | 150 | 160 |
| Croatia | 92 | 94 or 112 | 93 or 112 |
| Cyprus | | 112 or 199 | |
| Czech Republic | | 112 | |
| Denmark | | 112 | |
| Estonia | | 112 | |
| Faroe Islands | | 112 | |
| Finland | | 112 | |
| France | 17 | Hospital-based (SAMU) 15 | Fire Service-based 18 |
| Germany | 110 or 112 | 112 | |
| Greece | 100 | 166 | 199 |
| Hungary | 107 | 104 | 105 |
| Iceland | | 112 | |
| Republic of Ireland | | 112 or 999 | |
| Italy | 113 | 118 | 115 or 1515 |
| Kazakhstan | 102 | 103 | 101 |
| Kosovo | | 911 | |

APPENDIX A-continued

International Emergency Numbers

| Country | Police | Medical | Fire |
|---|---|---|---|
| Latvia | 2 | 3 | 1 |
| Lithuania | 02, 102, 022 | 03, 103, 033 | 01, 101, 011 |
| Luxembourg | 112 or 113 | 112 | |
| Republic of Macedonia | 192 | 194 | 193 |
| Malta | | 112 | |
| Moldova | 902 | 903 | 901 |
| Monaco | 17 | More severe 15 Less severe 18 | 18 |
| Netherlands | | 112 | |
| Norway | 112 | 113 | 110 |
| Poland | 997 | 999 | 998 |
| Portugal | | 112 | |
| Romania | | 112 | |
| Russia | 02 (until 2010-2012) | 03 (until 2010-2012) | 01 (until 2010-2012) |
| San Marino | 113 | 118 | 115 |
| Serbia | 92 | 94 | 93 |
| Slovakia | 158 | 155 | 150 |
| Slovenia | 113 | | 112 |
| Spain | National 091 Local 092 | 61 | 80,085 |
| Sweden | | 112 | |
| Switzerland | 117 | 144 | 118 |
| Turkey | 155 | 112 | 110 |
| Ukraine | 102 | 103 | 101 |
| United Kingdom | | 999 or 112 | |
| Australia | | 0 | |
| Fiji | | 911 | 9170 |
| New Zealand | | 111 | |
| Solomon Islands | | 999 | |
| Vanuatu | | 112 | |
| Canada | | 911 | |
| Mexico | | 066, 060, or 080 | |
| Saint Pierre and Miquelon | 17 | 15 | 18 |
| United States of America | | 911 | |
| Guatemala | 110 | 120 | 123 |
| El Salvador | | 911 | |
| Costa Rica | | 911 | |
| Panama | | 911 | |
| Barbados | 211 | 511 | 311 |
| Cayman Islands | | 911 | |
| Dominican Republic | | 911 | |
| Jamaica | 119 | | 110 |
| Trinidad and Tobago | 999 | | 990 |
| Argentina | 101 | 107 | 100 |
| Bolivia | 110 | 118 | |
| Brazil | 190 | 192 | 193 |
| Chile | 133 | 131 | 132 |
| Colombia | 112 or 123 (landlines and mobile phones) 156 | 132 | 119 |
| Guyana | 911 | 913 | 912 |
| Paraguay | | 911 | |
| Peru | 105 | | 116 |
| Suriname | | 115 | |
| Uruguay | | 911 | |
| Venezuela | | 171 | |

What is claimed is:

1. A computer-implemented method for providing emergency contact information on a computing device, comprising:

detecting an emergency phone call that is made using a phone application;

in response to detecting termination of the emergency phone call, (i) retrieving one or more emergency contact information from a memory resource of the computing device, and (ii) presenting the one or more emergency contact information on a display of the computing device;

enabling a user to select one of the one or more emergency contact information; and in response to the user selecting one of the one or more emergency contact information, initiating a phone call using the selected one of the one or more emergency contact information.

2. The method of claim 1, wherein presenting the one or more emergency contact information on the display of the computing device comprises displaying the one or more emergency contact information on a dialog box until either the dialog box is affirmatively dismissed or the step of initiating a phone call using the selected emergency contact information is initiated.

3. The method of claim 1, wherein the one or more emergency contact information comprises three contacts, the three contacts being assigned to quick keys 'I', 'C', and 'E' in a keypad of the computing device.

4. The method of claim 1, further comprising:
automatically transmitting a pre-populated message based on the one or more emergency contact information responsive to termination of the emergency phone call.

5. The method of claim 4, wherein the pre-populated message includes geographic location information of the computing device.

6. The method of claim 1, wherein the emergency phone call is a 9-1-1 call.

7. The method of claim 1, wherein detecting termination of the emergency phone call using the phone application comprises determining an emergency number based on a geographic location of the computing device and an international emergency number list comprising emergency numbers and associated geographic locations.

8. The method of claim 1, further comprising:
automatically transmitting a message containing information about the emergency phone call based on the selected one or more emergency contact information responsive to detecting termination of the emergency phone call.

9. A mobile computing device for providing pre-designated contacts, comprising:
a processor;
a storage medium to store instructions, that when executed by the processor, cause the processor to provide:
an emergency phone call determination module for detecting an emergency phone call that is made using a phone application;
an emergency contact information display module that operates to:
in response to detecting termination of the emergency phone call, (i) retrieve one or more emergency contact information from a memory resource of the mobile computing device, and (ii) present the one or more emergency contact information on a display of the mobile computing device; and
a communication module that operates to:
enable a user to select one of the one or more emergency contact information; and
initiate a phone call using the selected one of the one or more emergency contact information.

10. The mobile computing device of claim 9, wherein the emergency phone call determination module detects termination of the emergency phone call by determining a geographic location of the mobile computing device based on an international emergency number list comprising emergency numbers and associated geographic locations.

11. The mobile computing device of claim 9, wherein the communication module operates to transmit a message containing information about the emergency phone call to the pre-designated contacts in response to termination of the emergency phone call.

12. The mobile computing device of claim 9, wherein the emergency contact information display module operates to present the retrieved one or more emergency contact information on a dialog box until the dialog box is affirmatively dismissed or the communication to said pre-designated contact is initiated.

13. A non-transitory computer readable medium configured to store instructions, the instructions when executed by a processor cause the processor to perform steps comprising:
detecting an emergency phone call that is made using a phone application of a computing device;
in response to detecting termination of the emergency phone call, (i) retrieving one or more emergency contact information from a memory resource of the computing device, and (ii) presenting the one or more emergency contact information on a display of the computing device;
enabling a user to select one of the one or more emergency contact information; and
in response to the user selecting one of the one or more emergency contact information, initiating a phone call using the selected one of the one or more emergency contact information.

14. The non-transitory computer readable medium of claim 13, wherein the instructions cause the processor to detect the termination of the emergency phone call by determining an emergency phone number based on a geographic location of the computing device and an international emergency number list comprising emergency numbers and associated geographic locations.

15. The non-transitory computer readable medium of claim 13, further comprising instructions that cause the processor to:
automatically transmit a message containing information about the emergency phone call based on the one or more emergency contact information responsive to detection of the event.

16. The non-transitory computer readable medium of claim 13, wherein the instructions cause the processor to present the one or more emergency contact information by displaying the one or more emergency contact information on a dialog box until the dialog box is affirmatively dismissed or the communication to said pre-designated contact is initiated.

* * * * *

UNITED STATES PATENT AND TRADEMARK OFFICE
CERTIFICATE OF CORRECTION

| | | |
|---|---|---|
| PATENT NO. | : 8,385,879 B2 | |
| APPLICATION NO. | : 12/534797 | |
| DATED | : February 26, 2013 | |
| INVENTOR(S) | : Christopher Harvey Thomas | |

It is certified that error appears in the above-identified patent and that said Letters Patent is hereby corrected as shown below:

In the Specification:
In column 7, line 17, delete "Base" and insert -- Based on the geographic location of the --, therefor.

Signed and Sealed this
Thirteenth Day of August, 2013

Teresa Stanek Rea
*Acting Director of the United States Patent and Trademark Office*